J. BLACKBURN.
STEERING WHEEL.
APPLICATION FILED OCT. 27, 1919.
1,366,554.
Patented Jan. 25, 1921.
2 SHEETS—SHEET 2.
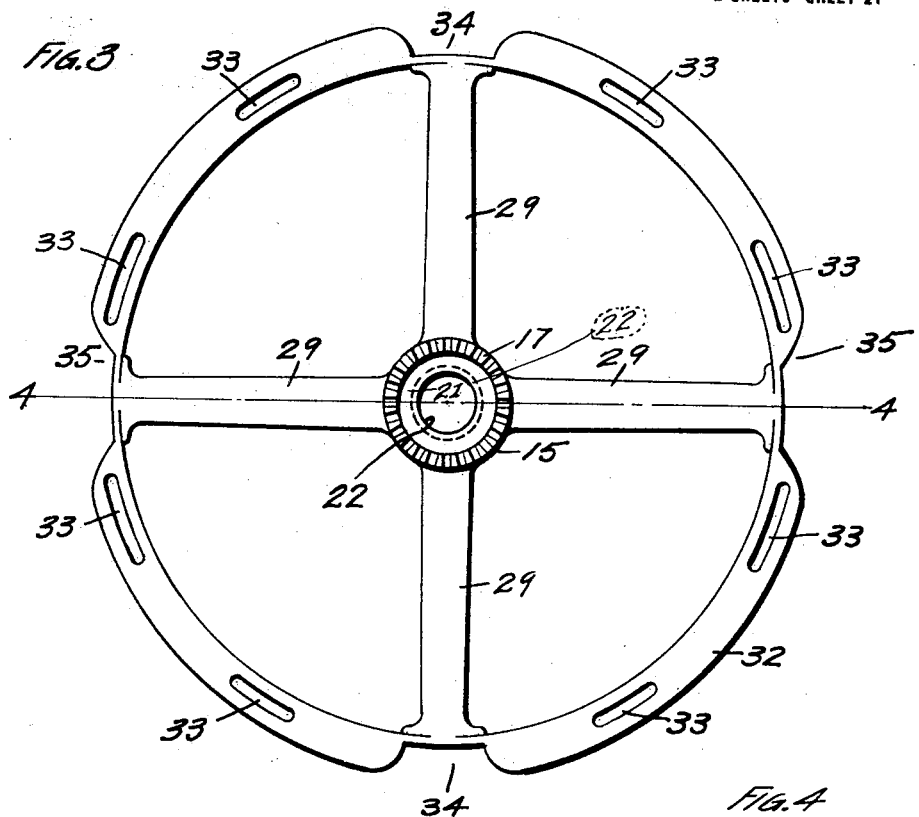
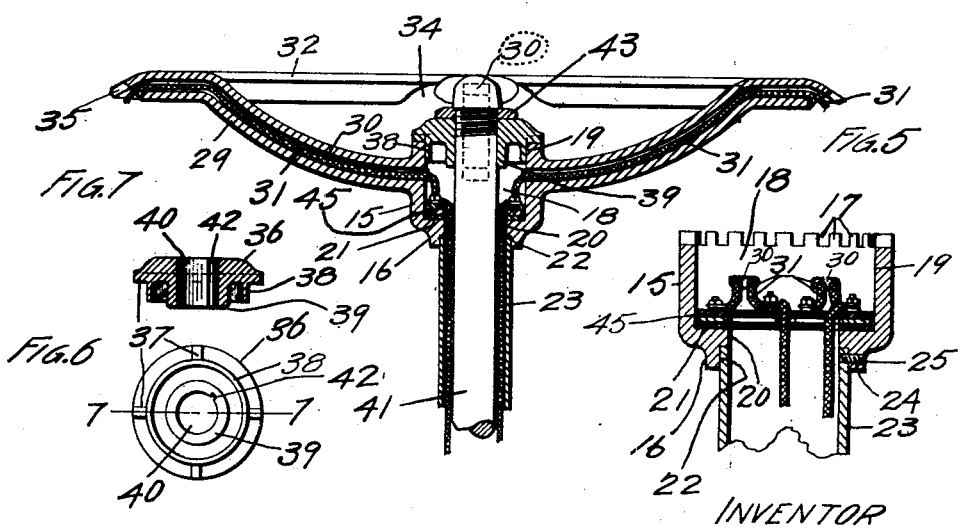
INVENTOR
JASPER BLACKBURN
BY Edward E. Lingan
ATTY.

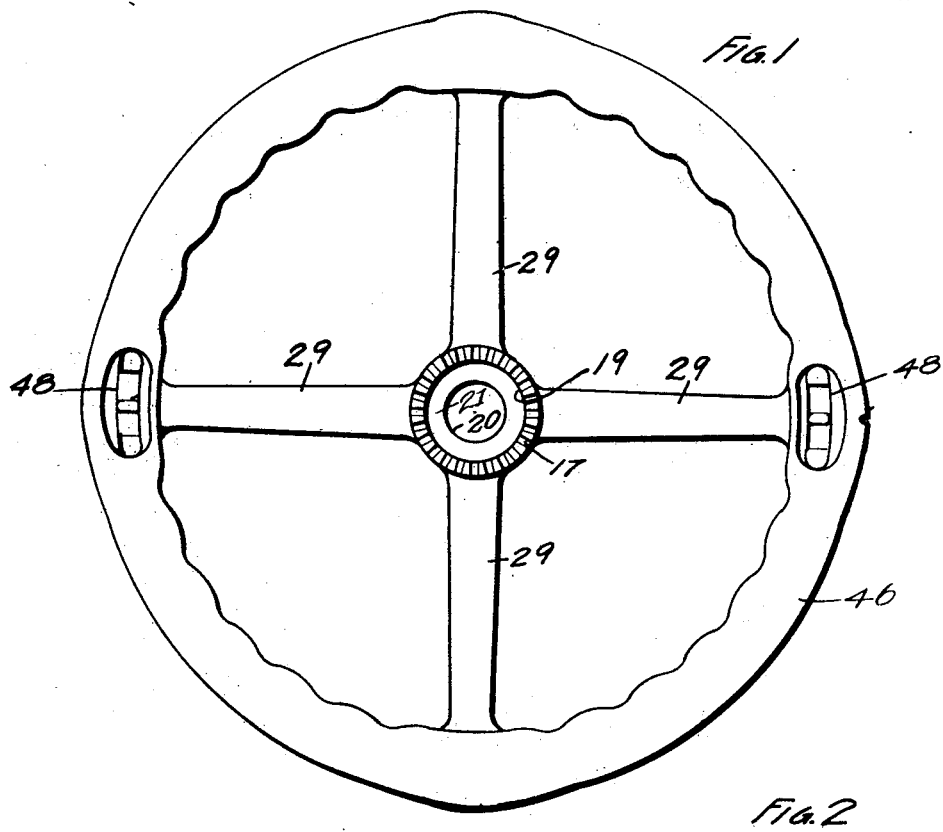

UNITED STATES PATENT OFFICE.

JASPER BLACKBURN, OF WEBSTER GROVES, MISSOURI.

STEERING-WHEEL.

1,366,554. Specification of Letters Patent. Patented Jan. 25, 1921.

Application filed October 27, 1919. Serial No. 333,657.

*To all whom it may concern:*

Be it known that I, JASPER BLACKBURN, a citizen of the United States, and a resident of Webster Groves, county of St. Louis, and State of Missouri, have invented certain new and useful Improvements in Steering-Wheels, of which the following is a specification containing a full, clear, and exact description, reference being had to the accompanying drawings, forming a part thereof.

My invention relates to improvements in steering wheels for automobiles, and has for its primary object to construct a steering wheel having a spider provided with hollow spokes, and a reinforcing rim connecting the spokes around which the rim proper of the steering wheel is molded.

A further object is to construct a steering wheel having a molded rim, which rim is provided with a recess from its under side so as to receive electrical conductors and push buttons or switches which lead to the different translating devices.

A still further object is to construct a steering wheel which has a hollow hub and which is adapted to be secured to a revoluble steering column and to the steering post, the space between the steering column and steering post being adapted to receive electrical conductors so that all the switches leading to the different translating devices can be located in the rim of the wheel.

In the drawings,

Figure 1 is a top plan view of my wheel with the steering post and its connecting mechanism removed.

Fig. 2 a side view of the same with parts broken away and in section.

Fig. 3 a top plan view of the spider made use of.

Fig. 4 a cross sectional view taken on the line 4—4 of Fig. 3, showing the steering column, steering post and the connecting means in position.

Fig. 5 an enlarged fragmental section of the hub of the spider.

Fig. 6 a bottom plan view of the means for connecting the steering wheel to the steering post.

Fig. 7 a cross sectional view taken on the line 7—7 of Fig. 6.

In the construction of my device, I provide a hub 15. This hub is provided at its bottom end with a reduced portion 16 and at its upper end with teeth 17. The hub is provided with a bore 18, its upper portion 19 being of larger diameter than the portion 20, thus forming the shoulder 21.

The reduced portion 16 is provided with a counter bore 22 which receives the steering column 23 of an automobile. The reduced portion 16 is also provided with an opening 24 through which the screw 25 is inserted, this screw 25 also passing through the steering column 23, and thus securely binds the spider to the steering column.

Formed integral with the hub 21 is a plurality of spokes 29. These spokes are formed hollow as indicated by the numeral 30. These spokes also serve as containers for electrical conductors 31 when it is desired to mount switches for governing translating devices in the rim of the wheel.

Formed integral with the spokes 29 is a web or reinforcing strip 32, this reinforcing strip being provided with openings 33 and cut-away portions 34 and 35. The upper portion of the hub 15 projects above the spokes 29 and is provided with teeth 17 as is clearly shown in Figs. 1, 2 and 3, and on the top is placed the sleeve 36 which is provided with teeth 37, these teeth being preferably four in number and meshed with the teeth 17.

My object in providing a number of teeth on the hub of the wheel is that the wheel and steering post can be adjusted independently of each other. The sleeve 36 is provided with a downward projection 38 which fits within the bore 18 of the hub and the downward projection 39 which is provided with a bore 40 of the same diameter as that of the steering post 41.

The projection 39 is also provided with a keyway 42, and the steering post 41 is also provided with a similar keyway. Thus the sleeve 36 and the post are secured together, in other words prevented from rotating except simultaneously.

The sleeve 36 is secured on the post 21 by means of the nut 43. This locks the post and steering wheel together, and by means of the screw 25 the steering column 23 also revolves. In the hub 16 and by means of the different sized bores is formed a shoulder 21, this shoulder serving as a rest for the electrical conducting rings and terminals 45. This however is not essential in case my structure is intended to be used as a steering wheel only, but is essential when the device is used as a switch carrying device, or in other words carries electrical conductors and switches so that the lights, ignition and signal devices are operated from the wheel.

Around the spokes 29 and the reinforcing rim 32 is molded a body of plastic material 46. This plastic material is provided on its under surface with a circumferential recess or channel 47, and on its upper surface with a pair of slots 48. The channel 47 and the slots 48 are formed simultaneously with the molding of the rim. In the recess 47 electrical conductors and contacting devices may be placed, and through the slots 48 the switches controlling the ignition and lighting system may be inserted.

The openings 33 formed in the reinforcing ribs 32 are for the purpose of securing the electrical conductors to the rim without coming in contact with any metallic substance, as well as to assist in binding the rim 46 to the spider.

It will be observed that the rim proper is formed of molded plastic material and reinforced, and simultaneously with the molding of the wheel rim the recess or channel 47 is formed therein for the reception of the contacting devices and conductors. If desired, the reinforcing rib 32 may be omitted and the ends of the hollow spokes 29 united to the molded rim in the operation of molding the rim, or the reinforcing rim 32 may be welded to the ends of the hollow spokes.

In the channel or recess 47 a conductor 49 is located, which is in contact with the contact making and breaking devices carried by the wheel rim, the conductor in the present instance being a flat piece of metal, or I may employ conducting wires. In the illustration the conductors 31 are attached to the conductor 49 and lead through the spokes, and are attached to the binding posts or terminals 50 located within the hub of the wheel, these binding posts being suitably insulated from the wheel hub and also from the steering post and column.

Having fully described my invention what I claim is:

1. A steering wheel provided with a hub, hollow spokes formed integrally with said hub, and a rim of molded material secured to the ends of said hollow spokes by molding, said rim being provided on its underneath surface with a channel for the reception of electrical conductors and contact making and breaking devices.

2. A steering wheel comprising a hub, hollow spokes formed integral with said hub, the opening of the spokes communicating with the interior of the hub, electrical conductor terminals located within the hub and below the spoke openings, a reinforcing rim formed integral with the ends of said hollow spokes, and a body of plastic material molded around said rim for forming the wheel rim, said wheel rim having formed on its underneath surface by pressing a channel for the reception of contact making and breaking devices and electrical conductors.

3. A steering wheel comprising a chambered hub provided with a peripheral opening into the chamber, spokes, of which one at least is provided with a channel, carried by said hub, a rim carried by said spokes and provided with a channel communicating with the said spoke channel, conductor terminals located within the chamber in the hub, conductors adapted to be located within the channel formed in the rim and extending through the spoke channel and the opening formed in the hub and leading to the chamber therein, attached to the said conductor terminals, and contact-making-and-breaking devices carried by the wheel rim from which the said conductors lead.

4. The combination of a steering column, a steering wheel at the upper end thereof formed with a chambered hub having peripheral openings leading into the hub chamber, spokes, of which one at least is provided with a channel, and a rim formed with a channel communicating with the said spoke channel, conductor terminals located in the hub chamber, conductors located within the channel in the rim and extending therefrom through the spoke channel to the said terminals in the hub, contact-making-and-breaking devices carried by the rim from which the said conductors lead, and other conductors leading from the said conductor terminals through the steering column.

5. A steering wheel provided with a hub, hollow spokes formed integral with said hub, the openings in said spokes communicating with the interior of said hub, and a series of electric terminals located within the hub and concealed thereby.

6. A steering wheel comprising a hub, terminals located within the hub and concealed thereby, hollow spokes formed integral with the hub adapted to receive electrical conductors, a rim secured to the ends of the spokes and provided with a channel adapted to receive an electrical conductor, and contact making and breaking devices carried by said wheel rim.

In testimony whereof, I have signed my name to this specification, in the presence of two subscribing witnesses.

JASPER BLACKBURN.

Witnesses:
E. M. SCHUCHARDT,
WALTER C. STEIN.